(12) United States Patent
Everaerts et al.

(10) Patent No.: US 8,361,632 B2
(45) Date of Patent: Jan. 29, 2013

(54) CLOUD POINT-RESISTANT ADHESIVES AND LAMINATES

(75) Inventors: Albert Everaerts, Oakdale, MN (US); Jianhui Xia, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 527 days.

(21) Appl. No.: 12/245,341

(22) Filed: Oct. 3, 2008

(65) Prior Publication Data

US 2010/0086705 A1 Apr. 8, 2010

(51) Int. Cl.
*B32B 17/10* (2006.01)
*B32B 27/08* (2006.01)
*B32B 27/30* (2006.01)

(52) U.S. Cl. .................. 428/520; 428/339; 428/522

(58) Field of Classification Search .................. None
See application file for complete search history.

(56) References Cited

U.S. PATENT DOCUMENTS

| | | | |
|---|---|---|---|
| 5,006,582 A | 4/1991 | Mancinelli | |
| 5,252,694 A * | 10/1993 | Willett et al. | 522/13 |
| 5,578,697 A | 11/1996 | Kawamonzen et al. | |
| 5,905,099 A | 5/1999 | Everaerts et al. | |
| 6,013,722 A | 1/2000 | Yang et al. | |
| 6,039,896 A | 3/2000 | Miyamoto et al. | |
| 6,558,790 B1 | 5/2003 | Holguin et al. | |
| 6,599,602 B2 | 7/2003 | Bennett et al. | |
| 6,949,297 B2 * | 9/2005 | Yang et al. | 428/520 |
| 7,097,903 B2 * | 8/2006 | Kishioka et al. | 428/354 |
| 2003/0031802 A1 | 2/2003 | Weiss et al. | |
| 2004/0202879 A1 | 10/2004 | Xia et al. | |
| 2006/0207722 A1 * | 9/2006 | Amano et al. | 156/327 |
| 2006/0246296 A1 | 11/2006 | Xia et al. | |
| 2007/0106017 A1 * | 5/2007 | Kessel et al. | 524/589 |
| 2007/0275319 A1 | 11/2007 | He et al. | |
| 2008/0118752 A1 | 5/2008 | Inoue et al. | |
| 2008/0124494 A1 | 5/2008 | Husemann et al. | |
| 2009/0104445 A1 | 4/2009 | Inoue et al. | |
| 2010/0182679 A1 | 7/2010 | Han et al. | |
| 2010/0247940 A1 | 9/2010 | Takahashi et al. | |

FOREIGN PATENT DOCUMENTS

| | | |
|---|---|---|
| EP | 0 924 060 A1 | 6/1999 |
| JP | 2001-123136 | 5/2001 |
| JP | 2002309212 | 10/2002 |
| JP | 2004091499 | 3/2004 |
| JP | 2004-263084 | 9/2004 |
| JP | 2004-311664 | 11/2004 |
| JP | 2009-031776 | 2/2009 |
| WO | WO 99/29795 | 6/1999 |
| WO | WO 01/42384 A2 | 6/2001 |
| WO | WO 2005/068521 A1 | 7/2005 |
| WO | WO2005080521 A1 * | 9/2005 |
| WO | WO 2005080521 A1 * | 9/2005 |
| WO | WO 2006/132488 A1 | 12/2006 |

* cited by examiner

*Primary Examiner* — Angela Ortiz
*Assistant Examiner* — Chinessa Adkins
(74) *Attorney, Agent, or Firm* — Stephen F. Wolf; Ann K. Gallagher

(57) ABSTRACT

Optically clear adhesives and laminates that include the adhesives are provided. The adhesives and laminates remain haze-free and are cloud point-resistant when placed in environments of high humidity and elevated temperature. The adhesives and laminates are useful in optical electronic display applications.

13 Claims, 1 Drawing Sheet

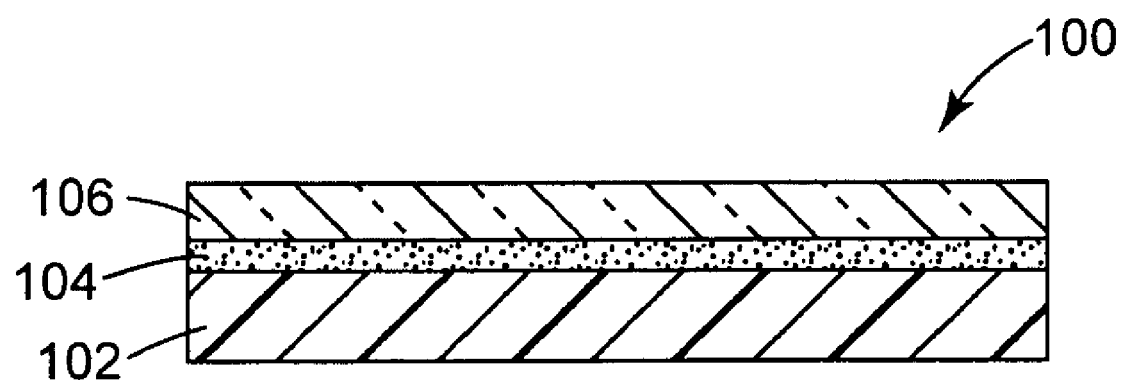

CLOUD POINT-RESISTANT ADHESIVES AND LAMINATES

FIELD

The present disclosure relates to optically clear adhesives and laminates that include the adhesives.

BACKGROUND

Optically clear pressure sensitive adhesives (OCAs) are finding wide applications in optical displays. Such applications include bonding polarizers to modules of a liquid crystal display (LCD) and attaching various optical films to a glass lens in, for example, mobile hand held (MHH) devices. During use, the display can be subjected to various environmental conditions, such as high temperature and/or high humidity.

It has been observed that OCAs can exhibit a cloud point, (turn hazy/"white") after subjecting optical laminates of optical films and OCAs to high temperature/humidity accelerated aging tests and subsequently cooling the laminates down to ambient conditions. While still hot, the laminates may be perfectly clear, even when saturated with moisture. But upon cooling they can exhibit a cloud point and turn hazy or "white". Frequently, the haze will disappear over time upon storage of the laminate under ambient conditions. The haze disappearance can often be accelerated by gently heating the optical laminates.

SUMMARY

There is a need for OCAs that remain clear and defect free when incorporated into optical displays, such as LCDs. There is a need for cloud point-resistant adhesives and laminates that do not become hazy when subjected to various environmental conditions such as temperature and humidity changes.

In one aspect, an optically clear laminate is provided that includes a first substrate having at least one major surface, a second substrate having at least one major surface, and a cloud point-resistant, optically clear adhesive composition situated between and in contact with at least one major surface of the first substrate and at least one major surface of the second substrate, wherein the adhesive composition is derived from precursors that include from about 75 to about 95 parts by weight of an alkyl acrylate having 1 to 14 carbon in the alkyl group, from 0 to about 5 parts of a copolymerizable polar monomer; and from about 1 to about 25 parts of a hydrophilic polymeric compound based upon 100 parts of the alkyl acrylate and the copolymerizable polar monomer.

In another aspect, an optically clear laminate is provided that includes a first substrate having at least one major surface, a second substrate having at least one major surface; and a cloud point-resistant, optically clear adhesive composition situated between and in contact with at least one major surface of the first substrate and at least one major surface of the second substrate, wherein the adhesive composition is derived from precursors that include from about 60 to about 95 parts by weight of an alkyl acrylate having 1 to 14 carbon atoms in the alkyl group, from 0 to about 5 parts of a copolymerizable polar monomer, and from about 5 to about 50 parts of a hydroxyl-containing monomer that has an OH equivalent weight of less than 400.

In yet another aspect, an optically clear adhesive composition is provided that is derived from precursors that comprise from about 75 to about 95 parts by weight of an alkyl acrylate having 1 to 14 carbon in the alkyl group, from 0 to about 5 parts of a copolymerizable polar monomer, and from about 1 to about 25 parts of a hydrophilic polymeric compound based upon 100 parts of the alkyl acrylate and the copolymerizable polar monomer.

By incorporating hydrophilic moieties in the OCA matrix, haze-free, cloud point-resistant OCAs can be obtained which remain clear even after high temperature/humidity accelerated aging tests. The provided OCA's are suitable for use in, for example, laminating polarizers to optical LCDs, attaching various optical films to glass lenses in mobile handheld devices, and other adhesive application that require optical clarity in various temperature and humidity environments.

Although not wishing to be bound by theory, it is thought that the haze appears when the OCA becomes saturated with water at elevated temperatures, and the concentration of water exceeds the cloud point when quickly cooled due to poor compatibility of the moisture with the OCA matrix. This can result in localized phase separation of small water droplets, which due to a mismatch in refractive index with the OCA matrix, causes haze or a "white" appearance. If the droplets remain very small (e.g., a few hundred nanometers or less) or the water remains fully solubilized in the adhesive under ambient conditions, the OCA will stay clear while it re-equilibrates its moisture content with the environment.

As used herein:

"cloud point" refers to the temperature at which a mixture of adhesive and water separate into a continuous adhesive phase and a dispersed water phase, where the dispersed phase is larger than the wavelength of light and thus make the adhesive appear "white" or cloudy;

"(meth)acrylate" or "(meth)acrylic" refers to either the acid or the ester or amide derivative of acrylic acid or methacrylic acid;

"white" or "cloudy" refers to an adhesive or laminate that is highly translucent so that it is difficult or impossible to visually observe an image though the adhesive or laminate;

BRIEF DESCRIPTION OF THE DRAWINGS

FIG. 1 is a cross section of a laminate of an optical film, a substrate and an embodied adhesive.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

An optically clear laminate is provided. The laminate includes a first substrate having at least one major surface, a second substrate having at least one major surface and a cloud point-resistant, optically clear adhesive composition. By cloud point-resistant it is meant that the adhesive composition, which is initially optically clear, remains optically clear after exposure to high temperature and humidity environments and subsequent cooling to ambient conditions. Optically clear adhesives are commonly used to mount optical films, such as polarizers or retardation plates, to substrate displays, such as liquid crystal cells in LCD applications. As such, the OCA is used to laminate the film to the substrate display to form an optically clear laminate. When used in a laminate, a cloud point-resistant, optically clear adhesive allows the laminate to remain virtually haze free or clear after exposure to nonambient temperature and humidity conditions.

The provided adhesive compositions incorporate hydrophilic moieties into the OCA to obtain haze-free optical laminates that remain haze-free even after high temperature/humidity accelerated aging tests. In one aspect, the provided adhesive compositions are derived from precursors that include from about 75 to about 95 parts by weight of an alkyl acrylate having 1 to 14 carbon in the alkyl group. The alkyl acrylate can include aliphatic, cycloaliphatic, or aromatic alkyl groups. Useful alkyl acrylates (i.e., acrylic acid alkyl ester monomers) include linear or branched monofunctional acrylates or methacrylates of non-tertiary alkyl alcohols, the alkyl groups of which have from 1 up to 14 and, in particular, from 1 up to 12 carbon atoms. Useful monomers include, for example, 2-ethylhexyl(meth)acrylate, ethyl(meth)acrylate, methyl(meth)acrylate, n-propyl(meth)acrylate, isopropyl (meth)acrylate, pentyl(meth)acrylate, n-octyl(meth)acrylate, isooctyl(meth)acrylate, isononyl(meth)acrylate, n-butyl (meth)acrylate, isobutyl(meth)acrylate, hexyl(meth)acrylate, n-nonyl(meth)acrylate, isoamyl(meth)acrylate, n-decyl (meth)acrylate, isodecyl(meth)acrylate, dodecyl(meth)acrylate, isobornyl(meth)acrylate, cyclohexyl(meth)acrylate, phenylmeth(acrylate), benzylmeth(acrylate), and 2-methylbutyl(meth)acrylate, and combinations thereof.

The provided adhesive composition precursors also include from about 0 to about 5 parts of a copolymerizable polar monomer such as acrylic monomer containing carboxylic acid, amide, urethane, or urea functional groups. Weak polar monomers like N-vinyl lactams may also be included. A useful N-vinyl lactam is N-vinyl caprolactam. In general, the polar monomer content in the adhesive can include less than about 5 parts by weight or even less than about 3 parts by weight of one or more polar monomers. Polar monomers that are only weakly polar may be incorporated at higher levels, for example 10 parts by weight or less. Useful carboxylic acids include acrylic acid and methacrylic acid. Useful amides include N-vinyl caprolactam, N-vinyl pyrrolidone, (meth)acrylamide, N-methyl(meth)acrylamide, N,N-dimethyl acrylamide, N,N-dimethyl meth(acrylamide), and N-octyl(meth)acrylamide.

The provided adhesive compositions also include from about 1 to about 25 parts of a hydrophilic polymeric compound based upon 100 parts of the alkyl acrylate and the copolymerizable polar monomer. The hydrophilic polymeric compound typically has a average molecular weight ($M_n$) of greater than about 500, or greater than about 1000, or even higher. Suitable hydrophilic polymeric compounds include poly(ethylene oxide) segments, hydroxyl functionality, or a combination thereof. The combination of poly(ethylene oxide) and hydroxyl functionality in the polymer needs to be high enough to make the resulting polymer hydrophilic. By "hydrophilic" it is meant that the polymeric compound can incorporate at least 25 weight percent of water without phase separation. Typically, suitable hydrophilic polymeric compounds may contain poly(ethylene oxide) segments that include at least 10, at least 20, or even at least 30 ethylene oxide units. Alternatively, suitable hydrophilic polymeric compounds include at least 25 weight percent of oxygen in the form of ethylene glycol groups from poly(ethylene oxide) or hydroxyl functionality based upon the hydrocarbon content of the polymer. Useful hydrophilic polymer compounds may be copolymerizable or non-copolymerizable with the adhesive composition, as long as they remain miscible with the adhesive and yield an optically clear adhesive composition. Copolymerizable, hydrophilic polymer compounds include, for example, CD552, available from Sartomer Company, Exton, Pa., which is a monofunctional methoxylated polyethylene glycol (550) methacrylate, or SR9036, also available from Sartomer, that is an ethoxylated bisphenol A dimethacrylate that has 30 polymerized ethylene oxide groups between the bisphenol A moiety and each methacrylate group. Other examples include phenoxypolyethylene glycol acrylate available from Jarchem Industries Inc., Newark, N.J. Other examples of polymeric hydrophilic compounds include poly acrylamide, poly-N,N-dimethylacrylamide, and poly-N-vinylpyrrolidone.

In another aspect, the provided laminates include adhesive compositions derived from precursors that include from about 60 parts by weight to about 95 parts by weight of an alkyl acrylate having 1 to 14 carbon in the alkyl group and from about 0 parts by weight to about 5 parts by weight of a copolymerizable polar monomer. The alkyl acrylate and the copolymerizable polar monomer are described above. The precursors also include from about 5 parts by weight to about 50 parts by weight of a hydrophilic, hydroxyl functional monomeric compound based upon 100 parts of the alkyl acrylate and the copolymerizable polar monomer or monomers. The hydrophilic, hydroxyl functional monomeric compound typically has a hydroxyl equivalent weight of less than 400. The hydroxyl equivalent molecular weight is defined as the molecular weight of the monomeric compound divided by the number of hydroxyl groups in the monomeric compound. Useful monomers of this type include 2-hydroxyethyl acrylate and methacrylate, 3-hydroxypropyl acrylate and methacrylate, 4-hydroxybutyl acrylate and methacrylate, 2-hydroxyethylacrylamide, and N-hydroxypropylacrylamide. Additionally, hydroxy functional monomers based on glycols derived from ethyleneoxide or propyleneoxide can also be used. An example of this type of monomer includes an hydroxyl terminated polypropylene glycol acrylate, available as BISOMER PPA 6 from Cognis, Germany. Diols and triols that have hydroxyl equivalent weights of less than 400 are also contemplated for the hydrophilic monomeric compound.

The pressure sensitive adhesive can be inherently tacky. If desired, tackifiers can be added to the precursor mixture before formation of the pressure sensitive adhesive. Useful tackifiers include, for example, rosin ester resins, aromatic hydrocarbon resins, aliphatic hydrocarbon resins, and terpene resins. In general, light-colored tackifiers selected from hydrogenated rosin esters, terpenes, or aromatic hydrocarbon resins can be used.

Other materials can be added for special purposes, including, for example, oils, plasticizers, antioxidants, UV stabilizers, pigments, curing agents, polymer additives, and other additives provided that they do not significantly reduce the optical clarity of the pressure sensitive adhesive.

The provided adhesive compositions may have additional components added to the precursor mixture. For example, the mixture may include a multifunctional crosslinker. Such crosslinkers include thermal crosslinkers which are activated during the drying step of preparing solvent coated adhesives and crosslinkers that copolymerize during the polymerization step. Such thermal crosslinkers may include multifunctional isocyanates, aziridines, multifunctional (meth)acrylates, and epoxy compounds. Exemplary crosslinkers include difunctional acrylates such as 1,6-hexanediol diacrylate or multifunctional acrylates such as are known to those of skill in the art. Useful isocyanate crosslinkers include, for example, an aromatic diisocyanate available as DESMODUR L-75 from Bayer, Cologne, Germany. Ultraviolet, or "UV", activated crosslinkers can also be used to crosslink the pressure sensitive adhesive. Such UV crosslinkers may include benzophenones and 4-acryloxybenzophenones.

In addition, the precursor mixtures for the provided adhesive compositions can include a thermal or a photoinitiator. Examples of thermal initiators include peroxides such as benzoyl peroxide and its derivatives or azo compounds such as VAZO 67, available from E. I. du Pont de Nemours and Co. Wilmington, Del., which is 2,2'-azobis-(2-methylbutyronitrile), or V-601, available from Wako Specialty Chemicals, Richmond, Va., which is dimethyl-2,2'-azobisisobutyrate. A variety of peroxide or azo compounds are available that can be used to initiate thermal polymerization at a wide variety of temperatures. The precursor mixtures can include a photoinitiator. Particularly useful are initiators such as IRGACURE 651, available from Ciba Chemicals, Tarrytown, N.Y., which is 2,2-dimethoxy-2-phenylacetophenone. Typically, the crosslinker, if present, is added to the precursor mixtures in an amount of from about 0.05 parts by weight to about 5.00 parts by weight based upon the other constituents in the mixture. The initiators are typically added to the precursor mixtures in the amount of from 0.05 parts by weight to about 2 parts by weight. The precursor mixtures can be polymerized and/or cross-linked using actinic radiation or heat to form the adhesive composition as described above and in the Examples below.

The pressure-sensitive adhesive precursors can be blended to form an optically clear mixture. The mixture can be polymerized by exposure to heat or actinic radiation (to decompose initiators in the mixture). This can be done prior to the addition of a cross-linker to form a coatable syrup to which, subsequently, one or more crosslinkers, and additional initiators can be added, the syrup can be coated on a liner, and cured (i.e., cross-linked) by an addition exposure to initiating conditions for the added initiators. Alternatively, the crosslinker and initiators can be added to the monomer mixture and the monomer mixture can be both polymerized and cured in one step. The desired coating viscosity can determine which procedure used. The disclosed adhesive compositions or precursors may be coated by any variety of known coating techniques such as roll coating, spray coating, knife coating, die coating, and the like. Alternatively, the adhesive precursor composition may also be delivered as a liquid to fill the gap between the two substrates and subsequently be exposed to heat or UV to polymerize and cure the composition. The thickness of the adhesive layer in the articles of disclosure tends to be at greater than about 5 micrometers, greater than about 10 micrometers, greater than about 15 micrometers, or even greater than about 20 micrometers. The thickness is often less than about 1000 micrometers, less than about 250 micrometers, less than about 200 micrometers, or even less than about 175 micrometers. For example, the thickness can be from about 5 to about 1000 micrometers, from about 10 to about 500 micrometers, from about 25 to about 250 micrometers, or from about 50 to about 175 micrometers. The greater the thickness of the adhesive the more cloud point resistant the adhesive has to be in order to be useful in a display application.

The pressure sensitive adhesive layer may be optically clear. As used herein, the term "optically clear" refers to a material that has a luminous transmission of greater than about 90 percent, a haze of less than about 2 percent, and opacity of less than about 1 percent in the 400 to 700 nm wavelength range. Both the luminous transmission and the haze can be determined using, for example, ASTM-D 1003-95. Typically, the optically clear adhesive may be visually free of bubbles.

The pressure sensitive adhesive layer desirably maintains optical clarity, bond strength, and resistance to delamination over the lifetime of the article in which it is used. Whether an adhesive will likely have these desirable characteristics can be determined using an accelerated aging test. The pressure sensitive adhesive layer can be positioned between two substrates for this test. The resulting laminate is then exposed to elevated temperatures, optionally, combined with elevated humidity conditions, for a period of time. For example, the cloud point-resistant pressure sensitive adhesive layer can often retain its optical clarity after aging at 90° C. for approximately 500 hours without humidity control (i.e., the relative humidity in the oven is usually below about 10 percent or below about 20 percent). Alternatively, the cloud point resistant pressure sensitive adhesive can often retain its optical clarity after aging at 70° C. for approximately 72 hours with a relative humidity of about 90 percent. Most importantly, the cloud point resistant pressure sensitive adhesive can often retain its optical clarity after aging at 70° C. for approximately 72 hours with a relative humidity of about 90 percent and rapid (i.e. within minutes) cooling to ambient conditions. After aging, the average transmission of the adhesive between 450 nanometers (nm) and 650 nm can be greater than about 85 percent and the haze can be less than about 2 percent.

Laminates are provided that include an optical film or optically clear substrate and a cloud point resistant optically clear pressure sensitive adhesive layer adjacent to at least one major surface of the optical film or substrate. The articles can further include another substrate (e.g., permanently or temporarily attached to the pressure sensitive adhesive layer), another adhesive layer, or a combination thereof. As used herein, the term "adjacent" can be used to refer to two layers that are in direct contact or that are separated by one or more thin layers, such as primer or hard coating. Often, adjacent layers are in direct contact. Additionally, laminates are provided that include a cloud point resistant pressure sensitive adhesive layer positioned between two substrates, wherein at least one of the substrates is an optical film. Optical films intentionally enhance, manipulate, control, maintain, transmit, reflect, refract, absorb, retard, or otherwise alter light that impinges upon a surface of the film. Films included in the laminates include classes of material that have optical functions, such as polarizers, interference polarizers, reflective polarizers, diffusers, colored optical films, mirrors, louvered optical film, light control films, transparent sheets, brightness enhancement film, anti-glare, and anti-reflective films, and the like. Films for the provided laminates can also include retarder plates such as quarter-wave and half-wave phase retardation optical elements. Other optically clear films include anti-splinter films and electromagnetic interference filters.

In some embodiments, the resulting laminates can be optical elements or can be used to prepare optical elements. As used herein, the term "optical element" refers to an article that has an optical effect or optical application. The optical elements can be used, for example, in electronic displays, architectural applications, transportation applications, projection applications, photonics applications, and graphics applications. Suitable optical elements include, but are not limited to, glazing (e.g., windows and windshields), screens or displays, cathode ray tubes, and reflectors.

Exemplary optically clear substrates include, but are not limited to a display panel, such as liquid crystal display, an OLED display, a touch panel, electrowetting display or a cathode ray tube, a window or glazing, an optical component such as a reflector, polarizer, diffraction grating, mirror, or cover lens, another film such as a decorative film or another optical film.

Representative examples of optically clear substrates include glass and polymeric substrates including those that contain polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes, polypropylenes, and cellulose triacetates. Typically, cover lenses can be made of glass, polymethyl methacrylates, or polycarbonate.

In other embodiments, the substrate can be a release liner. Any suitable release liner can be used. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film.

The release liner can be removed to adhere the optical film to another substrate (i.e., removal of the release liner exposes a surface of an adhesive layer that subsequently can be bonded to another substrate surface). Often, the adhesive layer is permanently bonded to this other substrate, although in some cases the adhesion may be limited to allow for reworking of the display.

The laminates have at least one of the following properties: the pressure sensitive adhesive layer has optical transmissivity over a useful lifetime of the article, the pressure sensitive adhesive can maintain a sufficient bond strength between layers of the article, the pressure sensitive adhesive can resist or avoid delamination, and the pressure sensitive adhesive can resist bubbling of the adhesive layer over a useful lifetime. The resistance to bubble formation and retention of optical transmissivity can be evaluated using accelerated aging tests. Laminates can often withstand exposure to elevated temperatures (e.g., 60 to 90° C.), optionally, under elevated humidity conditions (e.g., 80 to 90 percent relative humidity), for a period of time (e.g., 1 day to 1 month). In particular the laminates of this disclosure maintain their low haze and high transmission, even after prolonged exposure to elevated temperatures and elevated humidity (e.g., 60 to 90° C. and 80 to 90 percent relative humidity) followed by a rapid cool down to ambient condition (e.g. cooling to room temperature within minutes after exposure to the elevated heat and elevated humidity).

The adhesive compositions of the present disclosure may be applied directly to one or both sides of an optical element such as a polarizer. The polarizer may include additional layers such as an anti-glare layer, a protective layer, a reflective layer, a phase retardation layer, a wide-angle compensation layer, and a brightness enhancing layer. In some embodiments, the pressure sensitive adhesives of the present disclosure may be applied to one or both sides of a liquid crystal cell. It may also be used to adhere a polarizer to a liquid crystal cell. Yet another exemplary set of optical laminates include the application of a cover lens to a LCD panel, the application of a touch panel to an LCD panel, the application of a cover lens to a touch panel, or combinations thereof.

FIG. 1 is a cross sectional illustration of an embodiment of a provided optically clear laminate. The laminate 100 has cloud point-resistant adhesive composition 104 coated onto substrate 102. Optical film 106 is in contact with adhesive composition 104. The laminate provides an optically clear, haze resistant optical element.

Objects and advantages of this disclosure are further illustrated by the following examples, but the particular materials and amounts thereof recited in these examples, as well as other conditions and details, should not be construed to unduly limit this invention.

EXAMPLES

Materials

| | |
|---|---|
| EHA | 2-ethylhexyl acrylate |
| NVC | N-vinyl caprolactam |
| iBOA | isobornyl acrylate |
| IRGACURE 651 | 2,2-dimethoxy-2-phenylacetophone, a photoinitiator available from Ciba Specialty Chemicals, Tarrytown, NY. |
| DESMODUR L-75 | a multifunctional isocyanate crosslinker, available from Sartomer Company, Exton, PA. |
| HDDA | 1,6-hexanediol diacrylate |
| CD552 | monofunctional methoxylated polyethylene glycol (550) methacrylate, available from Sartomer. |
| SR9036 | ethoxylated (30) bisphenol A dimethacrylate, available from Sartomer. |
| HEA | 2-hydroxyethyl acrylate |
| 4HBA | 4-hydroxybutyl acrylate |
| PPA6 | poly(propylene glycol) acrylate, available as BISOMER PPA6 from Cognis, Germany. |
| VAZO 67 | 2,2'-azobis(2-methylbuyronitrile), a thermal initiator available from DuPont. |
| BA | butyl acrylate |
| MA | methyl acrylate |
| EtOAc | ethyl acetate |
| IOTG | isooctyl thioglycolate |

Accelerated Aging Test Method

Laminates were prepared by bonding a 125 μm thick polyester film (MELINEX 716, available from DuPont Company, Wilmington, Del.) to a float glass plate using the OCA (175 μm thickness). The laminates were placed in an oven set at 70° C./90% relative humidity (RH). After 72 hours the laminates were taken out of the oven, cooled down to room temperature, and visually observed. In addition to the visual observation the percent transmission and % haze measurement can also be made using for example the Byk-Gardner TCS Plus spectrophotometer. In this test the same optical laminate described above is used. During the test, the background is determined using the PET and glass only. Thus the reported values are for the adhesive only. The adhesive of this disclosure typically show less than 5% haze and preferably less than 2% haze after exposure to the accelerated aging test. In the haze test, "cloudy" means a haze of 10% or more, "slight haze" means a haze value below 5%, and "clear" means a haze value below 2%.

Example 1

A monomer premix was prepared using IRGACURE 651 (0.1 parts), EHA (55 parts), iBOA (40 parts), and NVC (5 parts). This mixture was partially polymerized under a nitrogen-rich atmosphere by exposure to ultraviolet radiation to provide a coatable syrup having a viscosity of about 3000 cps (3 PaS). Then HDDA (0.1 part), CD552 (5 parts), and additional IRGACURE 651 (0.16 parts) were added to the syrup and the syrup was knife-coated between two silicon-treated release lines at a thickness of 175 µm. The resulting coated material was then exposed to low intensity ultraviolet radiation (a total energy of 1 J/cm$^2$) having a spectral output from 300-400 nm with a maximum at 351 nm. The resulting OCA was laminated according to the procedure in the Accelerated Aging Test Method section.

Example 2

The same procedure was used as in Example 1, except after the syruping process, HDDA (0.1 part), CD552 (10 parts), and additional IRGACURE 651 (0.16 parts) were used.

Example 3

A 1-L bottle was charged with VAZO67 (0.35 g), BA (58.0 g), MA (40.0 g), HEA (2.0 g), CD552 (20 parts), IOTG (0.2 parts) and toluene (280 g). The solution was deaerated with nitrogen bubbling for 10 minutes and was then heated at 58° C. in a water bath for 24 hours with agitation. Then additional EtOAc (210 g) and toluene (40 g) were added to give a viscous solution at 20% solids. The solution was mixed with Desmodur L-75 (0.10 parts) and placed on a mechanical roller for 30 minutes. The solution was then coated on a release liner and dried at 70° C. to a final OCA thickness of 25 µm. A thick OCA sample for testing was made by laminating seven 25 µm samples together.

Example 4

The same procedure was used as in Example 1, except that HDDA (0.1 part), SR9036 (2 parts), and additional IRGACURE 651 (0.16 parts) were added to the coatable syrup.

Example 5

The same procedure was used as in Example 1, except that HDDA (0.1 part), SR9036 (5 parts), and additional IRGACURE 651 (0.16 parts) were added to the coatable syrup.

Example 6

The same procedure was used as in Example 1, except that HDDA (0.1 part), HEA (10 parts), and additional IRGACURE 651 (0.16 parts) were added to the coatable syrup.

Example 7

The same procedure was used as in Example 1, except that HDDA (0.1 part), HEA (20 parts), and additional IRGACURE 651 (0.16 parts) were added to the coatable syrup.

Example 8

The same procedure was used as in Example 1, except that HDDA (0.1 part), 4HBA (10 parts), and additional IRGACURE 651 (0.16 parts) were added to the coatable syrup.

Example 9

The same procedure was used as in Example 1, except that HDDA (0.1 part), 4HBA (20 parts), and additional IRGACURE 651 (0.16 parts) were added to the coatable syrup.

Example 10

The same procedure was used as in Example 1, except that HDDA (0.1 part), BISOMER PPA6 (50 parts), and additional IRGACURE 651 (0.16 parts) were added to the coatable syrup.

Comparative Example 1

The same procedure was used as in Example 1, except that HDDA (0.1 part) and additional IRGACURE 651 (0.16 parts) were added to the coatable syrup.

Comparative Example 2

The same procedure was used as in Example 3, except that the monomers charge were BA (58 parts), MA (40 parts), and HEA (2 parts).

Comparative Example 3

The same procedure was used as in Example 1, except that HDDA (0.1 part), BISOMER PPA6 (20 parts), and additional IRGACURE 651 (0.16 parts) were added to the coatable syrup.

TABLE 1

Visual Observations of Laminates after 72 hours 70° C./90% RH, cooled to RT)

| Example | OCA Composition | Observation |
|---------|-----------------|-------------|
| 1 | EHA/iBOA/NVC/CD552 55//40/5/5 | Slight Haze |
| 2 | EHA/iBOA/NVC/CD552 55//40/5/10 | Clear |
| 3 | BA/MA/HEA/CD552 58/40/2/20 | Clear |
| 4 | EHA/iBOA/NVC/SR9036 55/40/5/2 | Slight Haze |
| 5 | EHA/iBOA/NVC/SR9036 55/40/5/5 | Clear |
| 6 | EHA/iBOA/NVC/HEA 55/40/5/10 | Slight Haze |
| 7 | EHA/iBOA/NVC/HEA 55/40/5/20 | Clear |
| 8 | EHA/iBOA/NVC/4HBA 55/40/5/10 | Slight Haze |
| 9 | EHA/iBOA/NVC/4HBA 55/40/5/20 | Clear |
| 10 | EHA/iBOA/NVC/PPA6 55/40/5/50 | Clear |
| CE1 | EHA/iBOA/NVC 55/40/5 | Cloudy |
| CE2 | BA/MA/HEA 58/40/2 | Cloudy |
| CE3 | EHA/iBOA/NVC/PPA6 55/40/5/20 | Cloudy |

CE = Comparative Example

The results show that cloudiness (haze) can be reduced by incorporating hydrophilic moieties in the OCA. This can be achieved through the incorporation of increasing amounts of polymeric hydrophilic compounds such as those containing polyethylene oxide (such as, for example, CD552 or SR9036) or by using monomers with high hydroxyl equivalent content (such as, for example, 4HBA or HEA).

Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of this disclosure intended to be limited only by the claims set forth herein as follows.

What is claimed is:

1. An optically clear laminate comprising:
a first substrate having at least one major surface;
a second substrate having at least one major surface; and
a cloud point-resistant, optically clear adhesive composition situated between and in contact with at least one major surface of the first substrate and at least one major surface of the second substrate, wherein the optically clear adhesive composition is prepared by polymerizing a precursor mixture, the precursor mixture comprising:
from about 75 to about 95 parts by weight of an alkyl acrylate or a combination of alkyl acrylates having 1 to 14 carbon atoms in the alkyl group;
from 0 to about 5 parts of a copolymerizable polar monomer; and
from about 1 to about 25 parts of a hydrophilic polymeric compound based upon 100 parts of the alkyl acrylate and the copolymerizable polar monomer,
wherein the hydrophilic polymeric compound has an average molecular weight ($M_n$) of greater than about 500 and includes poly(ethylene oxide) segments,
wherein the laminate has a haze value of less than 5% and an average transmission between 450 nanometers and 650 nanometers of greater than about 85% after it is placed in an environment of at least 70° C. and 90% relative humidity for 72 hours, cooled to room temperature, and measured.

2. An optically clear laminate according to claim 1 wherein at least one of the first substrate and the second substrate are selected from a display panel, a touch panel, an optical film, a cover lens, and window.

3. An optically clear laminate according to claim 2 wherein the cover lens comprises at least one of glass, polymethylmethacrylate, or polycarbonate.

4. An optically clear laminate according to claim 2 wherein the display panel is selected from a liquid crystal display, a plasma display, an OLED display, an electrowetting display, and a cathode ray tube display.

5. An optically clear laminate according to claim 2 wherein the optical film is selected from a reflector, a polarizer, a mirror, an anti-glare or anti-reflective film, an anti-splinter film, a diffuser, or electromagnetic interference filter.

6. An optically clear laminate according to claim 1 wherein the alkyl acrylate or combination of alkyl acrylates comprises aliphatic, cycloaliphatic, or aromatic alkyl groups.

7. An optically clear laminate according to claim 1 wherein the adhesive composition comprises an alkyl acrylate that is selected from 2-ethylhexyl acrylate, isooctyl acrylate, isobornyl acrylate, butyl acrylate, methyl acrylate, and combinations thereof.

8. An optically clear laminate according to claim 1 wherein the adhesive composition comprises a polar monomer that has functional groups that are selected from carboxylic acids, amides, urethanes, ureas, and lactams.

9. An optically clear laminate according to claim 1 wherein the adhesive composition comprises a hydrophilic polymeric compound that further comprises at least one of a poly(ethylene oxide) having at least 10 repeat units, poly(N-vinylpyrrolidone), or poly(acrylamide).

10. An optically clear laminate according to claim 1 wherein the adhesive composition has a thickness of greater than about 100 µm.

11. An optically clear laminate according to claim 1 wherein the adhesive composition further comprises a crosslinker.

12. An optically clear laminate according to claim 1, wherein the adhesive has a visual light transmission of at least 90% and a haze of no more than 2% after it is placed in an environment of at least 70° C. and 90% relative humidity for at least 72 hours, cooled down to room temperature.

13. An optically clear adhesive composition that is prepared by polymerizing a precursor mixture, the precursor mixture:
from about 75 to about 95 parts by weight of an alkyl acrylate or a combination of alkyl acrylates having 1 to 14 carbon atoms in the alkyl group;
from 0 to about 5 parts of a copolymerizable polar monomer; and
from about 1 to about 25 parts of a hydrophilic polymeric compound based upon 100 parts of the alkyl acrylate or combination of alkyl acrylates and the copolymerizable polar monomer,
wherein the hydrophilic polymeric compound has an average molecular weight ($M_n$) of greater than about 500 and includes poly(ethylene oxide) segments,
wherein the laminate has a haze value of less than 5% and an average transmission between 450 nanometers and 650 nanometers of greater than about 85% after it is placed in an environment of at least 70° C. and 90% relative humidity for 72 hours, cooled to room temperature, and measured.

* * * * *

UNITED STATES PATENT AND TRADEMARK OFFICE
CERTIFICATE OF CORRECTION

PATENT NO. : 8,361,632 B2  
APPLICATION NO. : 12/245341  
DATED : January 29, 2013  
INVENTOR(S) : Albert Ivo Everaerts Page 1 of 1

It is certified that error appears in the above-identified patent and that said Letters Patent is hereby corrected as shown below:

In the Specification

Column 2  
Line 35, Delete "laminate;" and insert -- laminate. --, therefor.

Column 3  
Line 34, Delete "isobomyl" and insert -- isobornyl --, therefor.

Column 4  
Line 43, Delete "ethylenoxide" and insert -- ethyleneoxide --, therefor.

Column 8  
Line 27, Delete "2-phenylacetophone," and insert -- 2-phenylacetophenone, --, therefor.  
Line 38, Delete "(2-methylbuyronitrile)," and insert -- (2-methylbutyronitrile), --, therefor.

Column 9  
Line 23, Delete "VAZO67" and insert -- VAZO 67 --, therefor.

Signed and Sealed this  
Fifteenth Day of October, 2013

Teresa Stanek Rea  
*Deputy Director of the United States Patent and Trademark Office*